United States Patent [19]

Williams

[11] Patent Number: 4,801,207

[45] Date of Patent: Jan. 31, 1989

[54] METHOD AND APPARATUS FOR THE OPTICAL DETERMINATION OF SURFACE PROFILES

[75] Inventor: Daryl N. Williams, Mount Waverley, Australia

[73] Assignee: The Broken Hill Proprietary Company Limited, Victoria, Australia

[21] Appl. No.: 14,052

[22] PCT Filed: May 27, 1986

[86] PCT No.: PCT/AU86/00150

§ 371 Date: Jan. 2, 1987

§ 102(e) Date: Jan. 2, 1987

[87] PCT Pub. No.: WO86/07443

PCT Pub. Date: Dec. 18, 1986

[30] Foreign Application Priority Data

Jun. 14, 1985 [AU] Australia ............................ PH1039

[51] Int. Cl.⁴ .............................................. G01B 11/24
[52] U.S. Cl. ..................................... 356/376; 356/243; 356/385; 358/101; 358/106
[58] Field of Search ....................... 356/376, 384–387, 356/394, 243; 358/101, 107, 106

[56] References Cited

U.S. PATENT DOCUMENTS

| | | |
|---|---|---|
| 3,854,822 | 12/1974 | Altman et al. .................. 358/106 X |
| 4,111,557 | 9/1978 | Rottenkolber et al. ............. 356/394 |
| 4,188,544 | 2/1980 | Chasson ............................. 356/376 |
| 4,246,606 | 1/1981 | Yoshida ............................. 358/106 |
| 4,375,921 | 3/1983 | Morander ......................... 356/381 |
| 4,498,778 | 2/1985 | White ................................ 356/376 |
| 4,682,894 | 7/1987 | Schmidt et al. ..................... 356/243 |

FOREIGN PATENT DOCUMENTS

549761  5/1963  Australia .

*Primary Examiner*—F. L. Evans
*Attorney, Agent, or Firm*—Armstrong, Nikaido, Marmelstein & Kubovcik

[57] ABSTRACT

A method and apparatus for providing information as to the cross-sectional shape or profile of a body is disclosed in which a known datum in the form of a bar 50 having a cross-shaped cross-section is detected by a camera 14. A body is then detected by the camera 14 to provide preliminary information as to the shape or profile of the body and the preliminary information is transformed in accordance with a variation of the detected datum from the known datum to provide a better indication of the true cross-sectional shape or profile of the body. The known datum 50 enables at least three non-colinear reference locations to be defined and calibration parameters are determined from the reference locations so that exact reference locations can be determined.

9 Claims, 10 Drawing Sheets

FIG_3_

FIG_4B_

FIG_4A.

FIG_5A

FIG. 5B.

FIG_6A

VIDEO DATA FORMAT

EDGE CONTOURS (x)

MEDIAL LINE CONTOUR (⊙)

FIG_7_

VIDEO DATA FORMAT

FIG. 7A

EDGE CONTOURS(x)

FIG. 7B

MEDIAL LINE CONTOUR(o)

FIG. 7C

FIG_8

METHOD AND APPARATUS FOR THE OPTICAL DETERMINATION OF SURFACE PROFILES

TECHNICAL FIELD

The present invention relates to a method of and apparatus for providing information as to the cross-sectional shape or the profile of a body (such as steel bars, railway wheels and ceramic, plastic or wooden objects) or for measuring the cross-sectional dimensions thereof. This invention relates to an improvement to the invention set forth in our earlier Australian application no. 87638/82; European application No. 82902344.9; Japanese application No. 502438/82; Canadian application No. 409,525 and U.S. application Ser. No. 476,869. The subject matter of those applications is hereby incorporated by this reference.

BACKGROUND ART

In our earlier applications it was explained that in the production of continuous or semi-continuous materials by either a rolling extruding or other forming processes, for example the manufacture of steel bar in a rolling mill, it is usually desired to obtain data on the cross-sectional shape and dimensions of that product at least at the finishing end of the process. The invention disclosed in our earlier application provides goods results. However, the purpose of this invention is to improve the accuracy of the obtained data.

DISCLOSURE OF INVENTION

Thus, the object of this invention is to provide a method and apparatus for providing information as to the cross-sectional shape or profile of the body which remove geometric distortions due to viewing geometry and thus enables a more accurate determination of the required information without the need for or reliance on rigid control of the geometry of the system. However, once a particular geometry is selected the geometry should be held rigid throughout calibration and measurement steps.

It should be understood that the reference in this specification to the provision of information as to the cross-sectional shape or profile of the body includes information relating to the dimensions of the body, shape and relative location of the body. It should also be understood that reference to light in the specification includes non-visible as well as visible parts or the electromagnetic radiation spectrum. It should also be understood that reference to steel bar or metal bar in the specification includes rolled or extruded sections such as channel, angle, rail or the like. It should be understood that reference to the measurement (or object) plane refers to the plane in which profile measurement is desired and which is highlighted by the illumination source.

The present invention may be said to reside in a method of providing information as to the cross-sectional shape or profile of at least a portion of a surface of a body, including the steps of providing a known datum, said known datum including at least four substantially planar surfaces substantially perpendicular to the measurement plane such that four lines formed by the intersection of these planes with the measurement plane define at least three non co-linear reference locations at the intersections of said lines, detecting said known datum, illuminating said body to produce reflected light from said body to provide preliminary information as to the cross-sectional shape or profile of the body, transforming said preliminary information in accordance with a variation of said detected datum from said known datum to provide a better indication of the true cross-sectional shape or profile of at least a portion of the surface of the body to thereby provide said information or allow the information to be obtained therefrom.

The present invention may also provide an apparatus to provide information as to the cross-sectional shape or profile of at least a portion of a surface of a body including illumination means to project light towards said body, sensing means for detecting light from a known datum means, said known datum means including at least four substantially planar surfaces substantially perpendicular to the measurement plane such that lines formed by the intersection of those planes with the measurement plane cause at least three non co-linear reference locations to be defined by the intersections of said lines, the sensing means sensing light from said body to provide preliminary information concerning said body and said datum means, transforming means for transforming said preliminary information in accordance with a variation of said detected datum means from said known datum means to provide a better indication of the cross-sectional shape or profile of at least a portion of the surface of the body to thereby provide said information or allow the information to be obtained therefrom.

Distortion caused by the viewing geometry of the sensor means will distort the datum, accordingly the transformation of the preliminary information concerning the body in accordance with the variation between the detected datum and the known datum will compensate for that distortion so that more accurate information as to the cross-sectional shape or profile of the body will be obtained.

The provision of the known datum having the features described above allows the three reference points to be more easily and more accurately determined since the detecting equipment can more accurately locate a line and thereby more accurately form a reference point at the intersection of two lines than by forming a discrete reference point which is illuminated by the illumination means. Thus, since the reference locations can be more accurately determined more accurate information as to the cross-sectional shape or profile of the body can be provided.

In the preferred embodiment of the invention the known datum consists of a bar which has a cross-section in the form of a cross and the first, third, second and fourth planes are defined by the end surface of one arm of the cross a side surface of that arm of the cross a side surface of an adjacent arm of the cross and the end surface of the adjacent arm of the cross.

In a further aspect the invention may be said to reside in a method of providing information as to the cross-sectional shape or profile of at least a portion of a surface of a body, including the steps of providing a known datum, detecting said known datum to form at least three reference locations from said known datum which, with a derived fourth reference location, define a parallelogram whose shape can be used to determine calibration parameters, iteratively determining said calibration parameters so that substantially exact first, second, third and fourth reference locations can be determined, illuminating said body to produce reflected light from said body to provide preliminary information as to the cross-sectional shape or profile of the body, transformation said preliminary information in accordance with a variation of the position of said substantially exact reference locations from the known positions of said reference locations on said known datum to provide a better indication of the true cross-sectional shape or profile of at least a portion of the surface of the body to therefore provide said information or allow the information to be obtained therefrom.

The present invention may also be said to reside in an apparatus to provide information as to the cross-sectional shape or profile of at least a portion of a surface of a body, including illumination means to project light towards said body, sensing means for detecting light from a known datum from which at least three reference locations can be substantially exactly determined with a derived fourth reference location being determined to define a parallelogram which can be used to determine calibration parameters, processing means for iteratively determining said calibration parameters, said sensing means sensing light from said body to provide preliminary information concerning said body, said processing means also being for transforming said preliminary information in accordance with a variation of the location of said substantially exact reference locations from the known locations from the known datum means to provide a better indication of the cross-sectional shape or profile of at least a portion of the surface of the body to thereby provide said information or allow the information to be obtained therefrom.

The use of an iterative technique to determine the calibration parameters and therefore the exact location of the reference locations enables the exact location of the reference locations to be quickly determined thereby increasing the speed by which an accurate measure of the body can be obtained. This, of course, increases efficiency of the method and apparatus.

Preferably the illumination from said body is strobed so that the body appears to be substantially stationary when preliminary information as to the cross-sectional shape or profile of the body is obtained.

Strobing the illumination is preferred because it overcomes any problem of vibration of the body during the manufacturing process which tends to increase the difficulty of obtaining the preliminary information. The strobing provides a frozen image of the body so that when the preliminary information is detected the body appears to be substantially stationary thereby overcoming the problems associated with vibration.

The known datum may be detected at the same time that the body is detected by the illuminating means or the known datum may be detected in an initial step and the body may be detected in a subsequent step. Preferably the illumination is strobed by strobing the illumination means. However, in alternative embodiments the detecting means could be strobed by sequentially causing the detecting means to receive an image from the body and then not receive an image from the body.

BRIEF DESCRIPTION OF DRAWINGS

Preferred embodiments of the invention will be described with reference to the accompanying drawings in which.

MODE FOR CARRYING OUT THE INVENTION

Figure 1:
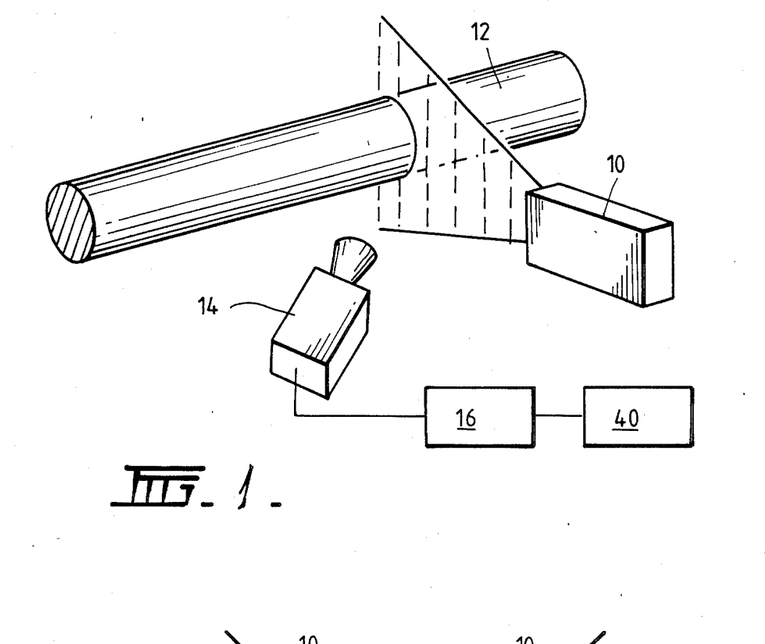
FIG. 1 is a schematic diagram of a slit illumination technique which can be embodied in the present invention.
Figure 2:
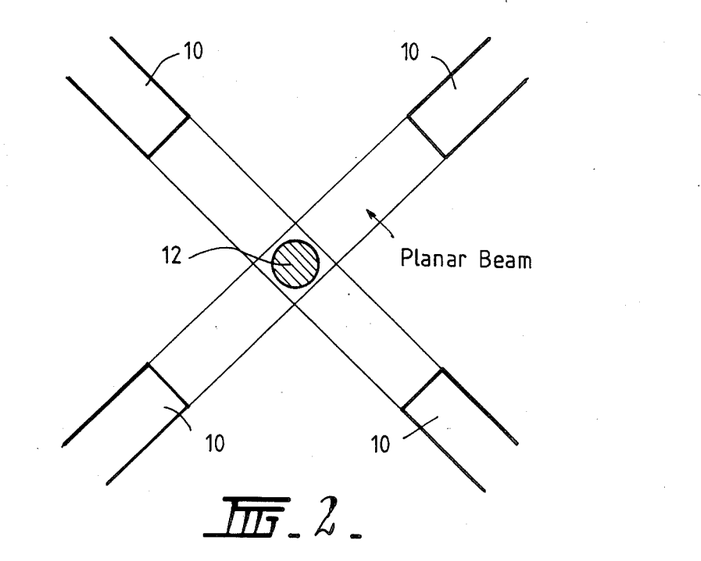
FIG. 2 shows the geometry of the illumination means used in the preferred embodiment of the invention.

Referring to the drawings a slit light source 10 (which is preferably a linear xenon flash tube which is collimated is shown which illuminates a steel bar 12 with a planar beam of light. The light is diffusely reflected from the steel bar and received by a camera 14 which is connected to image processing equipment 16 and a numerical and graphic output device 40 such as a video screen. FIG. 2 shows the preferred geometry of the flash tubes 10 relative to the bar 12. As shown four flash tubes 10 are provided which totally illuminate the bar 12. Four cameras (not shown) are also provided to provide a complete image of the bar 12. The cameras may be provided adjacent to the flash tubes 10 or may be purely located in the spaces between flash tubes 10. The specific geometry of the cameras is not essential provided that a complete image of the cross-section of the bar 12 can be obtained from the cameras 14.

Figure 3:
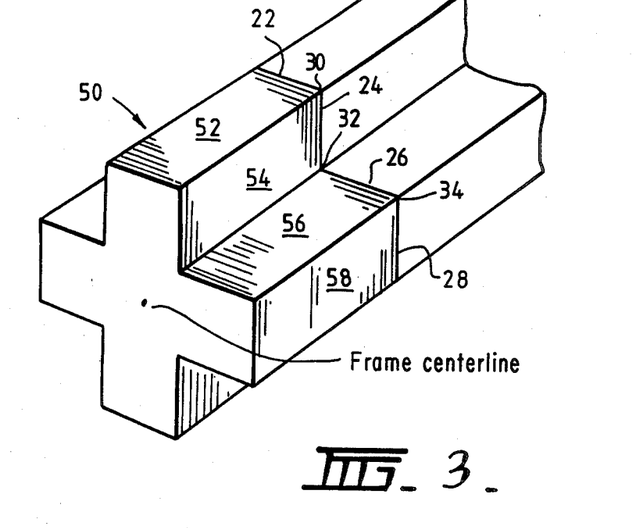
FIG. 3 shows the preferred reference datum which is in the form of a bar having a cross-shaped cross-section.

A reference datum for use in the preferred embodiment of the invention is shown in FIG. 3. The reference datum is located on a roll table or the like on which the steel bars will travel in order to calibrate the cameras 14 and to enable data to be obtained which will be used in performing transformations to compensate for perspective distortion due to the viewing geometry of the cameras. The datum comprises a steel bar 50 which has a cross-shaped cross-section. The steel bar can be of any desired length and for convenience is preferably about 30 cm in length. The bar 50, in view of its cross-sectional shape, includes a first plane 52 defined by an end of one arm of the cross a second plane 54 defined by one side of that arm of the cross a third plane 56 defined by one side of an adjacent arm of the cross and a fourth plane 58 defined by the end of the adjacent arm of the cross. Thus, when the bar 50 is illuminated by the four flash tubes 10 lines 22, 24, 26 and 28 are produced on the bar 50. Of course, lines are produced on each of the other arms of the bar as well. However, lines 22 to 28 are sufficient to extract the necessary information, for calibrating a camera which can view all of lines 22 to 28 and enabling the necessary transformations to be performed. The planar surfaces 52 and 56 are parallel to one another and spaced from one another as shown in FIG. 3 and the planar surfaces 54 and 58 are spaced from one another and parallel as also shown in FIG. 3. It will also be evident that the surfaces 54 and 58 are perpendicular to the surfaces 52 and 56. The lines 22 to 28 therefore have the same geometry. The intersection of the lines 22 and 24, 24 and 26 and 26 and 28 produce reference points 30, 32 and 34.

Calibration of the cameras 14 takes place as follows:

In order to transform a camera image into a specified plane, the position and orientation of the camera with respect to a point in a reference plane must be known.

Figure 4A:
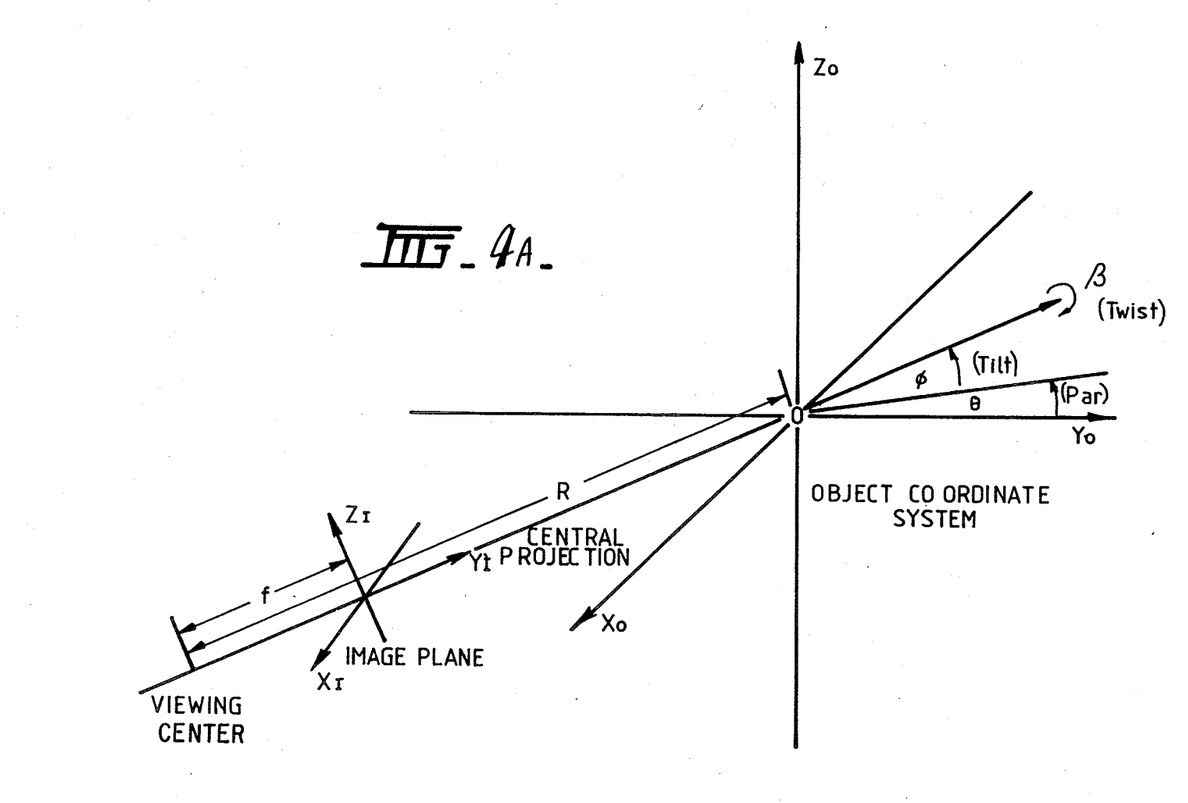
FIGS. 4A and 4B are diagrams of the geometry of the system showing how calibration parameters can be obtained.
Figure 4B:
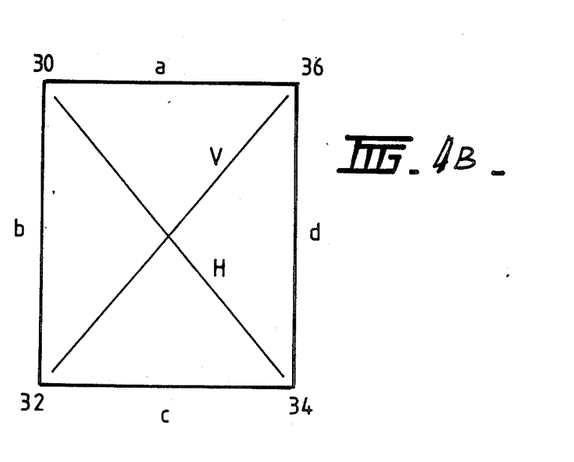

Pan, tilt and twist angles together with magnification define the camera location if the lens focal length is known. These angles are shown in FIG. 4.

Each camera in the gauge has a perspective distorted view of part of the reference datum such that each determines its location with respect to the object plane and a frame centre line.

The calibration points are determined to a high accuracy, by fitting four lines to the camera image of lines 22-28 and placing the calibration points 30, 32, 34 at the line intersections.

The three calibration points, with a derived fourth point 36 define a parallelogram, whose shape can be used to determine the calibration parameters.

Initial estimates of pan ($\theta$), tilt ($\phi$), twist ($\beta$), magnification (m) and frame centreline coordinates (OXI, OYI) are all iteratively modified using error functions and safe convergence factors, as below, until all of the transformation errors fall below an acceptable level.
n—1 e.g. $\theta_n = \theta_{n-1} + \epsilon \times F\theta_{n-1ps}$ where $\epsilon$ is a safe but fast convergence factor and $F\theta$ is an error function, utilizing the parallelogram shape descriptions, which is first order dependent only on $\theta$.

The calibration reference points and error functions are as below.

Points 0, 1, 2 are measured.
Point 3 is derived to complete a parallelogram.
Point 4 is derived as an estimate of the frame centreline.
(xi, yi) are the image coordinates of point i.
FM = (V+H)/(known undistorted size of V+H) −1
F$\theta$ = (a+c)/(b+d) −1
F$\phi$ = 1 − V/H
F$\beta$ = (X3 − xi + yo − y2)/(V+H)
FOXI = M × (xi − (X3 − xl)/2)
FOYI = M × (yi − (y3 − yl)/2)

Figure 5A:
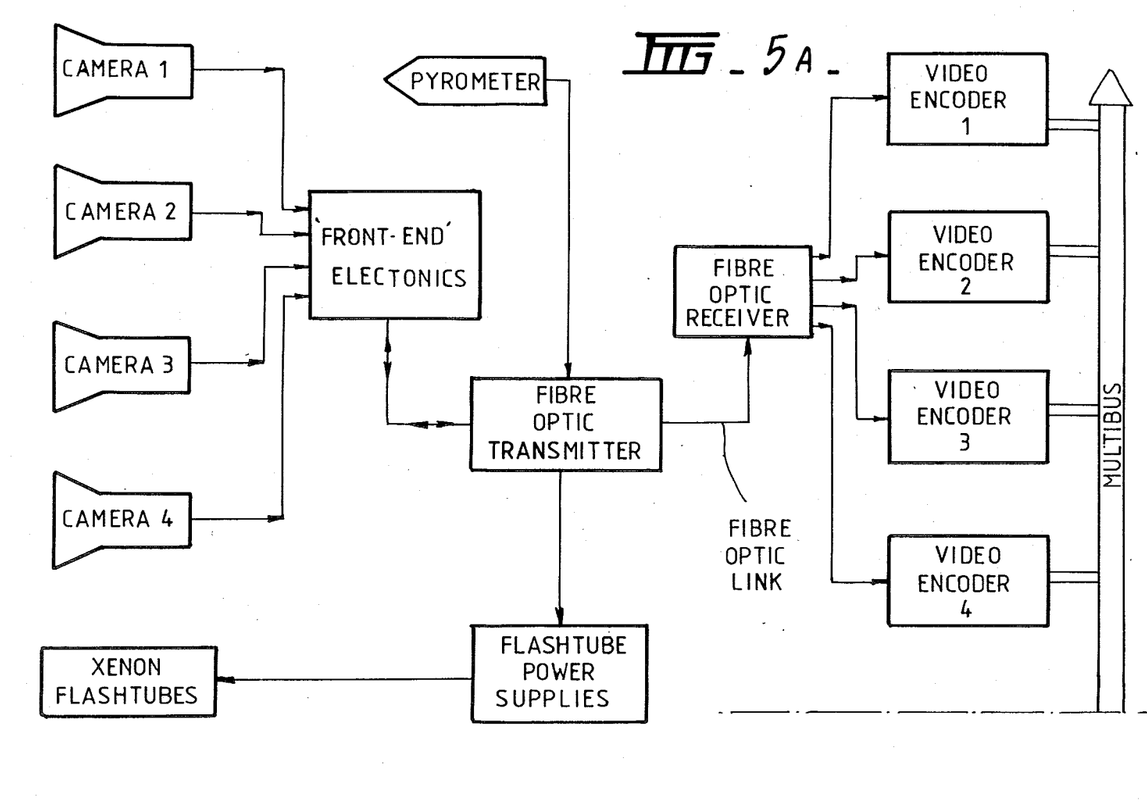
FIGS. 5A and 5B are a diagram of the system layout.
Figure 5B:
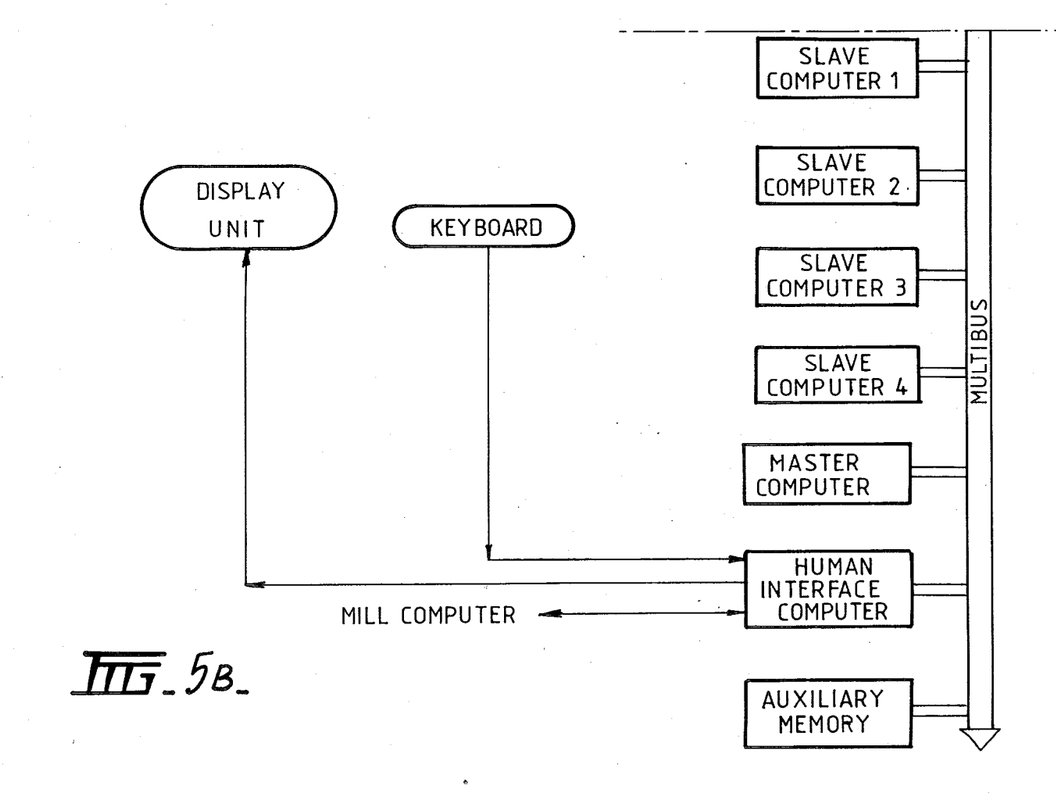
Figure 6A:
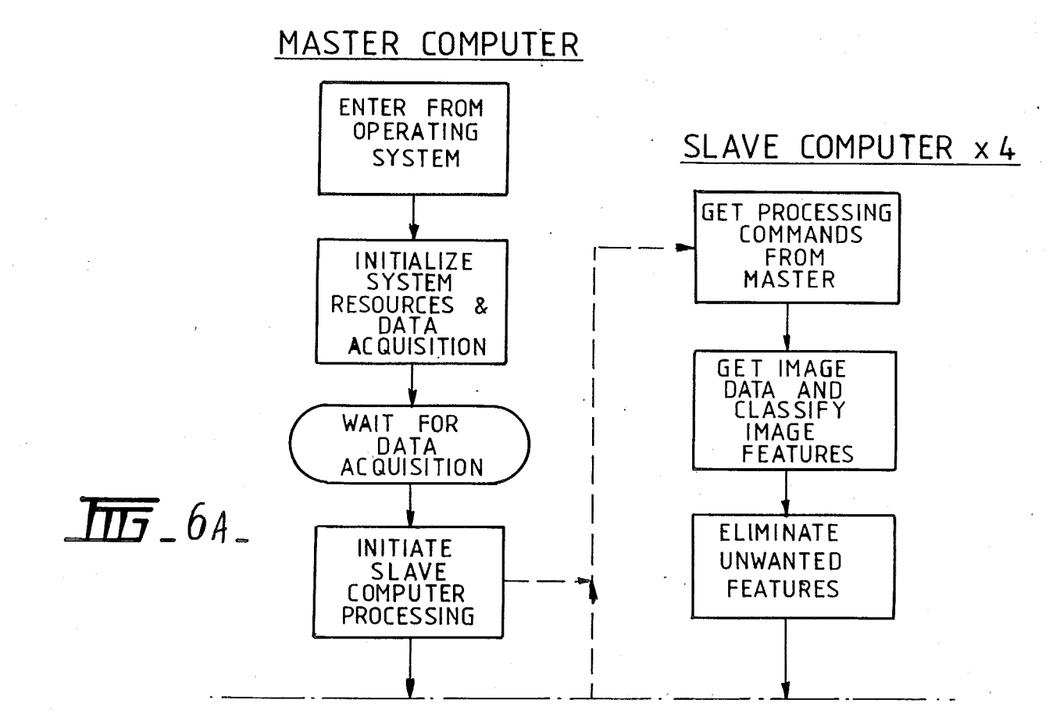
FIGS. 6A and 6B show a simplified processing flow chart.
Figure 6B:
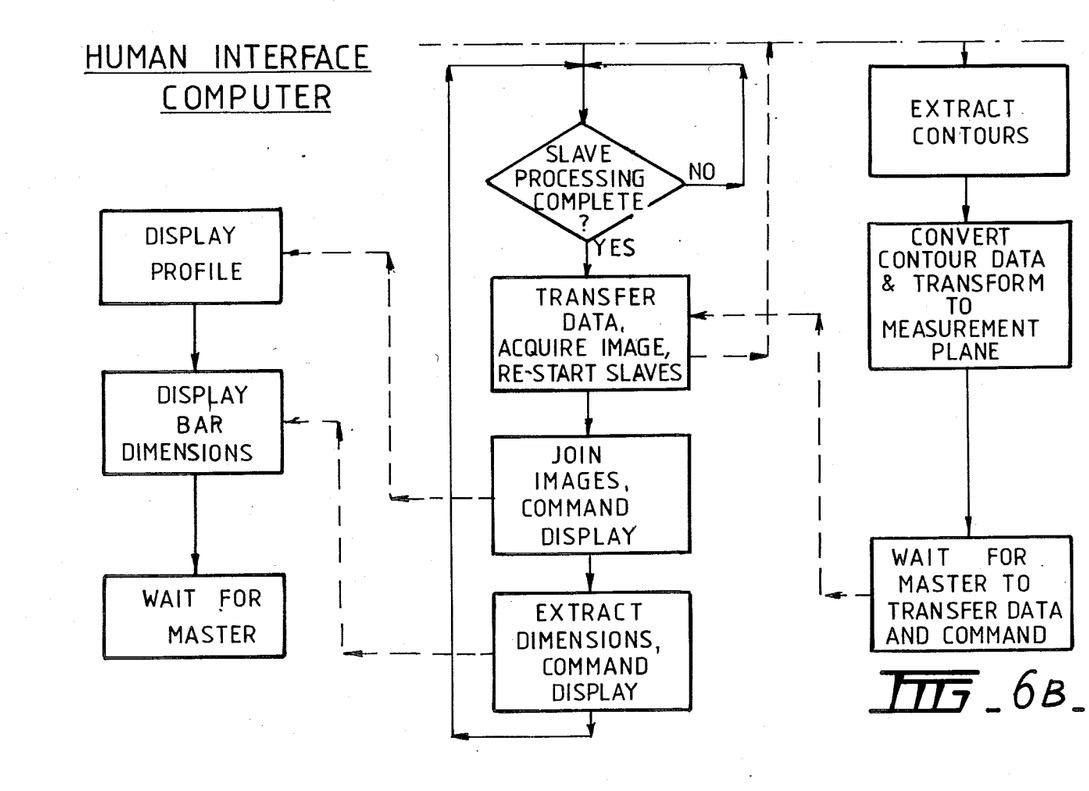

The complete system as illustrated in FIGS. 5A and 5B makes use of the processing power of six microcomputers to reconstruct the bar profile. In order to achieve this, the four binary images produced by the cameras 14 are spatially digitized and this data is passed to the computers where the necessary transformations are performed to reconstruct the bar profile. FIG. 6 is a simplified flow chart of the processing which is performed to reconstruct the bar profile and determine the dimensional and shape parameters of the bar.

It can be seen that the bar profile measurement naturally divides into two tasks, these being the generation and acquisition of the image data and the subsequent processing of that data. The overall accuracy of the system is determined by these processes and the interactions of the parameters which control them, but for the purpose of this analysis it is convenient to treat them as largely separate although some obvious interactions will be treated.

Figure 7:
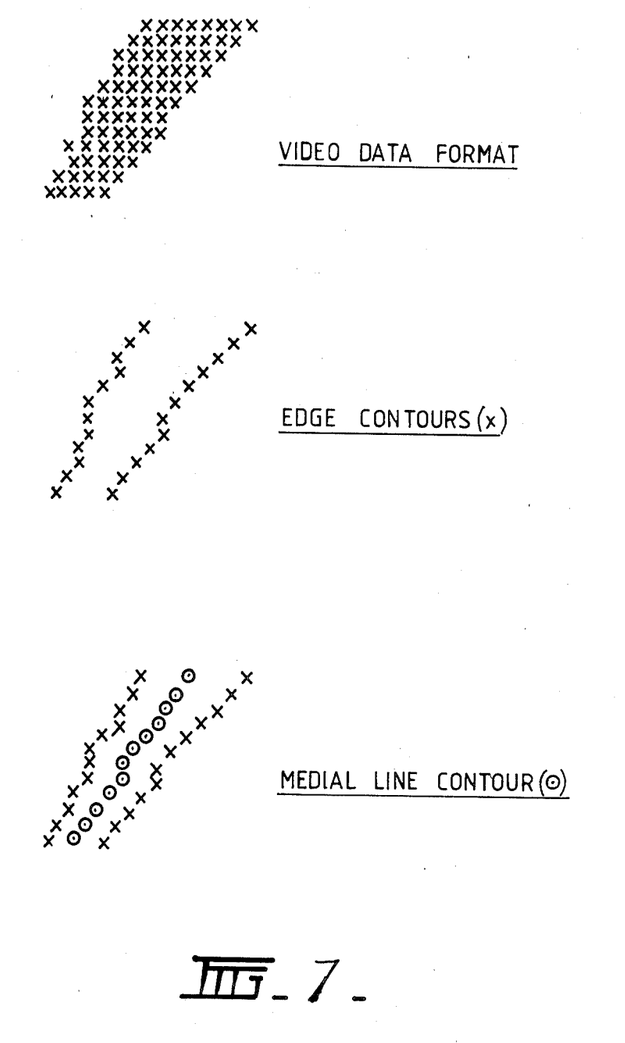
FIGS. 7A, 7B and 7C show extractions of image contours.
Figure 7A:
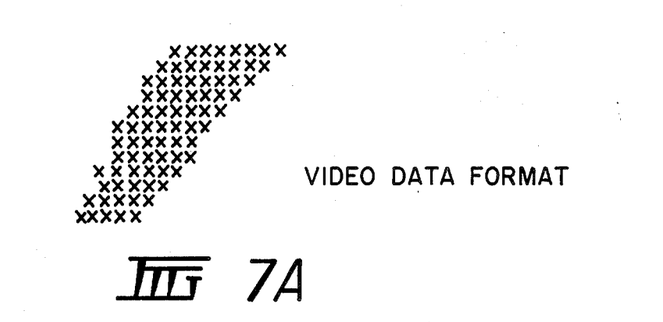
Figure 7B:
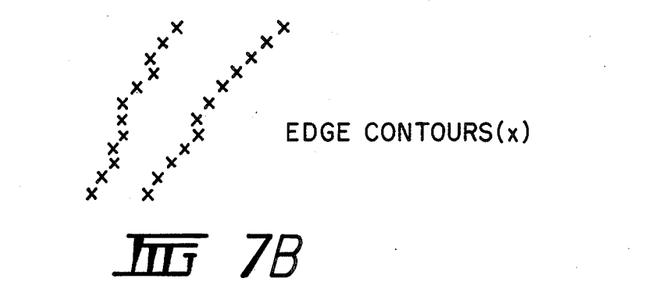
Figure 7C:
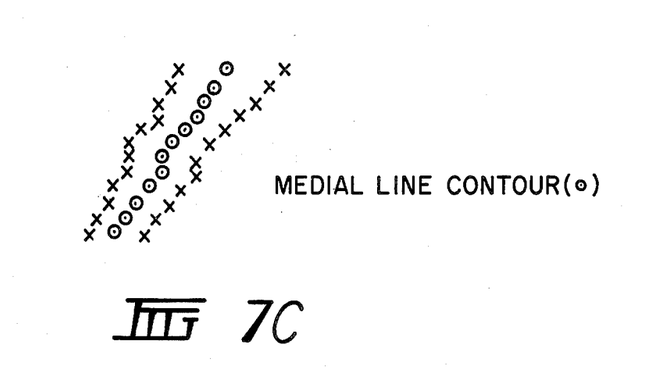

The image which is produced by the cameras is determined by the field of view of the cameras 14, the geometry of the image and the illumination of the target. The video signal is then converted to a binary image with a comparator and this is spatially digitized. The information which is then acquired is a function of the video comparator threshold setting, the camera scan geometry and the sampling processes inherent in the operation of the CCD sensor and the positional digitizing of the video signal The information obtained from the four camera images is then processed to correct for the image plane alignment and the effects of distortion due to perspective. The extraction of the cross-sectional contour of the bar from the images is subject to errors from the quantised nature of the positional information. As a result of the fact that the image of the bar contour extends over a number of points, the characterisation of a line or point image from this data is dependent on the algorithm used to decide on the position of that line or point as determined from the extended or thick image feature (FIG. 7).

The estimation of the true bar profile is achieved with an algorithm which extracts the position of the peak of the flashtube line (which is symmetrical) by analysing the image using a prior knowledge of the approximate camera-target geometry, further improving accuracy relative to simpler contour extraction schemes which were previously used. The use of mathematically exact transformations to reconstruct the object plane profile has also further improved the first prototype. These transformation accurately project the camera image back onto the measurement plane and thus eliminate the effects of perspective and camera alignment to give an accurate picture of the bar cross-section.

An illumination frame (not shown) is manufactured from mild steel and houses the four flashtubes 10 in radial arms. These flashtubes 10 are strobed on computer command and are collimated by slits which are air purged. The flashtubes 10 and slits must be aligned so that their beams are coplanar. This facility is provided by a mechanical adjustment device in each flashtube holder. Strobing of the flashtubes provides a "frozen" or stationary image of the bar 12 which enables the contour of the bar to be more easily determined.

A camera frame (not shown) provides the mounting for the four cameras 14. Each camera 14 is mounted on a water cooled base plate which is attached to the frame via an adjustable mount, facilitating alignment of the cameras 14.

The camera operation is controlled by the Front End Electronics unit (FEE) 60 which provides a crystal locked clock signal to each camera, for video data readout, as well as horizontal and vertical synchronisation derived from this master clock to control line and frame timing respectively. The video signals from the cameras are 'windowed' by the synchronizing logic to define a common image frame. The video signal from each camera is passed to a comparator circuit where it is converted to a binary (two level) video signal. Individual threshold adjustments are provided for each channel to accommodate differences in camera performance. Facilities to display both binary and analogue video are provided. The synchronizing clocks and the four binary video signals are then transmitted from the FEE via a fibre optic link 62, 63, 64 to the processing computers.

A two colour pyrometer 66 with a fast response time is used to determine the bar surface temperature and to determine when the bar nose appears at the illumination frame. The pyrometer head has air purging and water cooling and is connected to its display unit in the FEE cubicle by an armoured cable. The output of the display unit is converted from analogue voltage to digital frequency and passed to the fibre optic link 62, 63, 64 for transmission to the processing unit.

The output of the preceding stand tachometer is converted from voltage to frequency, optically isolated, and passed to the processing unit.

The master clock and the camera video data are transmitted over a fibre optic link. The fibre optic link provides a wide-band communications link free of the problems of interference, ground loops and crosstalk which can be associated with conductive links. The communications links as used in the Bar Profile Gauge provide a minimum signal bandwidth of 25 MHz. The fibre optic link provides six fast channels (each with a 25 MHz bandwidth) and sixteen slow channels in each direction (each with a 1.5 MHz bandwidth) to link the FEE and the computers. (One spare fast channel and several spare slow channels are provided.)

A four way multiplexer is provided to allow a single processing unit to service up to 4 measurement frames. The multiplexer handles all of the fibre optic links and tachometer signals for each measurement frame and is software controlled. The processor unit is expected to service only one measurement frame at a time but is capable of time sharing the computing resources between multiple frames with a proportional increase in measurement cycle time.

The data from the camera 14 are passed to the image processing computers via a respective encoder using Direct Memory Access (DMA) to a high speed Random Access Memory (RAM). The encoder is used to decrease the memory required for image storage and ease the access time requirements. In each slave image there are almost 0.5 million pixels which need not all be stored (there are typically 10,000 to 20,000 'white' pixels) but storage of individual 'white' pixel x and y co-ordinates would still impose severe storage and access time constraints. A technique of encoding suitable for binary images is used to reduce the memory requirements to 8K bytes.

During the acquisition of a frame of data all access to the video RAM other than by the encoding circuitry is disabled and the encoded frame is loaded into the memories. When frame acquisition is complete the slave computer 70 (such as an Intel 8086 based single board computer with an 8087 Numeric Data Processor (NDP)) analyses the image, classifying features within the image and eliminates features which are not classified as part of the bar image, extracts the contour of the bar from the image and transforms the data to the measurement plane (the plane of flashtube illumination) co-ordinate system.

A master computer 72 (such as an Intel 8086 based single board computer with an 8087 NDP) controls all system operations while a similar human interface computer 74 handles user and mill computer interfaces. The user interface is via a colour graphics monitor 76 and a standard typewriter keyboard 78. The monitor is used for all data display and communication from the system to the user. The keyboard allows the user to communicate with the system. Remote display stations consist of a monitor and an industrial actuator panel, providing only the main operational functions.

The master computer accepts the processed images from the slave computers, reformats them, links them together and extracts target dimensions. The human interface computer then displays the composite contour and the data on the colour monitor. The master computer also performs all the calculations necessary during the calibration procedures.

The computers and video encoders are all housed in a single chassis (which also houses the fibre optic receiver) and are mounted in a Multibus card cage. All communication between the computers is over the Multibus 80. Priority between the computers is resolved by a system of on board priority resolution circuits and a common interface. The master processor has overall priority over the slaves, provides necessary system clock and synchronises the acquisition and processing of the data.

The flashtubes 10 are provided with a triggerable power supply 82 housed in an enclosure mounted near the illumination frame. The FEE provides the power supplies for the cameras and the supplies for its own electronics. These units are all installed near the camera and illumination frames.

The cameras 14 on their own frame, are mounted approximately 700 mm downstream from the illumination frame. Fitted to the lenses are filters which pass only the radiation from the flashtubes. The viewing aperture of the camera box in sealed with heat reflecting glass and the inside of the camera boxes is insulated to stabilize the camera ambient temperature.

The basic data processing function performed by the instrument is the analysis of a binary image produced by stripe illumination of the target bar and the extraction of the bar parameters from the image. FIG. 6 shows a simplified flowchart of the image processing performed during instrument operation.

The image processing, apart from the hardware run length encoding, is currently all implemented in software. Future higher resolution cameras and faster cycle times require the use of the hardware image processors now becoming available.

The video data obtained from the cameras is an NTSC standard (525 lines per frame, 30 frames per second, 60 fields per second) television is digitised to two levels (a binary image), read out from all cameras by a master clock with all cameras synchronised to line and frame timing signals derived from the master clock. The data is in the form of an interlaced frame (both odd and even fields of the frame are used) consisting of approximately 480 active lines (the vertical window set by the FEE is adjustable).

During frame acquisition this data is encoded using run-length-encoding and the frame stored in high speed video RAM via Direct Memory Access. The run-length-encoded format consists of the line address (counting from the left), of each 'white' segment in the image and the 'length' (in pixels) of the segment. During the frame acquisition these data are packed into 16 bit words. At the start of each video line the line address (number) is loaded into the video RAM as a 16 bit number (the six most significant bits are zeros). This number takes account of the odd/even field arrangement and thus performs the first stage of the frame interlace. For each white segment in a line, the horizontal pixel address (10 bits) and the run length (6 bits) are packed into a 16 bit word and stored at the next memory address. If the run length is greater than 64 pixels successive segments of 64 pixels with the same x address are stored to build up a segment of the correct length. On completion of the frame acquisition (controlled by the field and line synchronising pulses and the master clock) the video RAM is enabled for access from the Multibus so that processing can take place.

The first stage of processing is the reformatting and storage of the image in the 'on board' memory of the slave computer dedicated to the processing of images from its allocated camera. Lines with no 'white' segments are ignored and composite segments (i.e. segments greater than 64 pixels in length) are combined to produce a single segment. Individual segment information is stored in four 16 bit words in a data structure of up to 4096 words. This structure (called IMAGE-DATA in the slave program) is defined in PLM 86 format as IMAGE-DATA (1024) STRUCTURE (IY WORK, IX WORD, IR WORD, IP WORD) where IY is the line address, IX is the horizontal address of the start of the segment and IR is the segment length (IP is used in later processing). The frame is processed so that line storage is continuous—i.e. line numbers in the structure IMAGE-DATA are sequential—and this completes the interleaving of the video information. (During acquisition, the frame is acquired as two separate fields which are not physically interleaved although the line numbers are allocated according to the interleaved structure as the image would be displayed on a television monitor.)

To process the images the slave computers must be able to decide which parts of the image are valid data (i.e. belong to the target bar contour) and which can be rejected (i.e. are camera defects, reference points, noise artefacts or stray features). To make these decisions the image must be segregated into a number of distinct 'features', and this is done by scanning the image from the top line down so that each segment is allocated to a particular 'feature'. Each segment is checked to see if it 'connects' with another segment and if so is added to the feature containing that segment. If features meet they are merged to form a single feature. The computer tracks the allocation of features by using the IP word in the IMAGE-DATA structures to store the number of the feature that the segment has been allocated to. To facilitate later processing the IP word is used to make the IMAGE-DATA structure a 'linked list'. This is achieved by including in each IP word the index to the next segment which forms part of the feature. The most significant six bits are the feature number, the least significant ten bits are the index in IMAGE-DATA to the next segment of the features (0 indicates the end of the segment). In this way the computer can later rapidly scan the structure IMAGE-DATA for segments belonging to a particular feature without having to examine every segment.

Having developed a description of the image in terms of features it is then necessary to extract the feature of features which represent the stripe illumination of the bar. Ideally this would be the only feature present in the image. However, the CCD cameras suffer from point and line defects which can produce video signals of sufficient magnitude to appear in the binary image after thresholding. In addition, noise and unwanted features such as reference points and airborne debris will be present in the image.

The image is 'cleaned' after the features have been tagged, by classifying the features and deleting those which are not considered part of the target. During segmentation (or feature identification) a description of each feature is built up. This description includes the feature area, the position of its centroid, the number of segments in the feature and the indices of the first and last segments as well as its maximum and minimum extents in the x and y directions. If a feature centre is too close to the image boundaries it cannot be part of the target bar and is therefore deleted.

Separation of the stripe illumination bar segment is achieved by deleting all image features which do not satisfy a selected set of criteria. The decisions to delete features are based on factors such as the size or position of a feature. Since the major feature of interest is known to be greater than a given size all features smaller than that size can be deleted. The computer is also capable of 'learning' the positions of CCD array defects and reference points and using this information to eliminate these features from the image. Simple shape descriptors such as the ratio of length to width can also be used to eliminate defects (such as line defects) if the bar being measured has a shape with known descriptors.

During calibration the system 'learns' the position of the camera defects and the reference points and then during normal operation (when these are not required) deletes them. Small features (with an area less than a predetermined size) are also deleted since these cannot be processed to extract a valid contour. On command from the master computer the slave computer may attempt at this stage to perform a rough fit of features to an approximation to a circle defined by the largest image feature. On completion of this stage of processing the image consists of features of suitable size belonging to he target bar (there may only be one such feature with a good image).

Once the image defects have been identified and eliminated or rectified one is left with one or more features which have a width or thickness of several pixels and which must be reduced to a contour of sub-pixel width. The requirement is therefore for an algorithm which will select a continuous line of pixels which is mid-way between the inner and outer edges of the thick image, a so called medial line contour.

The approach being taken in analysis of the bar image is to make maximum use of prior knowledge of the image characteristics. In particular it is known that the image is relatively long and thin and that no branches are present. The extraction of line contours is performed by each slave computer on the video data from its allocated camera.

The procedure adopted for contour extraction consists of determining the pixel location which is the best estimate of being midway between the two edges of the relatively thin contour representing the reflected image of the illumination stripe on the bar surface. The contour point estimate used is the average of all feature pixels in he Vertical Vanishing Point direction. This estimate uses the known symmetrical illumination strip intensity profile to provide contour points to half-pixel resolution.

The concept of the Vertical Vanishing Point (VVP) is illustrated by the effect observed when standing between and viewing along the length of a pair of straight, parallel railway lines. Although it is known that these rails never meet the effect of perspective is to make the two rails appear to converge at a distant point. This distant point is termed a 'vanishing point' and, depending on the orientation of the observer and the scene, may be a vertical, horizontal or other vanishing point. The location of the VVP in the Bar Profile Gauge is precisely determined during the calibration process by mathematically extending the images of precisely machined parallel surfaces until they converge.

The slave computers, having acquired an estimate of the line contour which is in word x and y co-ordinates based on the image pixel locations, convert these to a set of floating point co-ordinates.

The floating point image co-ordinates are then transformed to the measurement plane using the system parameters derived during the calibration set previously disclosed and the mathematical transforms which project the image data onto the measurement plane. The transformation from pixel co-ordinates to measurement plane co-ordinates is achieved assuming nothing about the physical pixel dimensions of the arrays other than that the pixels are evenly spaced. These imaging transformations are set forth in the applications mentioned previously and will therefore not be disclosed herein.

To maximise the parallel computing portion of the profile analysis, the slaves calculate a partial least squares fit to a circle, which the master will later complete. When the slave computer image processing tasks of image acquisition, segmentation, contour extraction and transformation are complete the slave computers wait for the master computer to acquire the transformed profile data. The master computer then initializes another slave acquisition cycle and processes the previously acquired profile.

The master computer combines the partial least squares circle fit results calculated by the slaves and determines a bar centroid. If the bar is of a convex shape the master uses the centroid to join the data from the four slaves. The joining algorithm averages all slave profile points in each half degree radial slice to produce one point per slice.

If the bar is of a shape involving major concave sections the joining algorithm must be modified and the centroid is used only for display centering.

The master produces approximately 720 profile points for any bar shape, which are then displayed by the human interface computer. The data extraction which follows is dependent on the bar shape and the dimensions required.

The two main data extraction types are "roll related" or "product related". The former extracts dimensions which are taken at fixed positions on the bar for direct usage in the roll control process. These dimensions include pass, shoulder and sides dimensions. The product related dimensions are determined solely by user requirements. A round bar might require the measurement of minimum, maximum and average diameters while a flat sided bar might require minimum and maximum across flat measurements and corner angles. Rails and structural sections require more complex data extraction to define their more complex shapes.

The master commands all slaves to acquire a simultaneous image of the known calibration shape and calculates from each raw image in turn, the position and orientation of each camera with respect to the calibration fixture. The shape provides several straight lines in each camera view, allowing the determination of three calibration points to a high accuracy using line fit techniques. Error functions are calculated for each of the required calibration constants and the rapidly converging iterative algorithm previously disclosed is used.

The physical interface to the operator is provided by a standard keyboard and a colour graphics monitor. The human interface computer operation is controlled by a 'supervisor' programme which provides the link between the operator and the measurement system. The operator is provided with a library of commands which are used to setup the system, calibrate it, run the measurement functions and, in the event of problems occurring, execute diagnostics. System commands are entered by the user in a menu driven entry format.

The system provides a set of diagnostics which allow the operator to interrogate the system and perform a number of system functions. The facilities provided include:
  examination or alteration of all volatile memory contents.
  image acquisition and diagnostics at all stages of the image processing including the use of simulated data.
  graphical display of all memory contents.

All diagnostics functions are controlled, via the master computer, from the keyboard.

With the flashtubes 10 turned off (i.e. no bar image available) and video thresholds suitably adjusted the camera defect positions are learned by acquiring and classifying an image. The locations of the defects are then stored in non-volatile memory in order that they can be tested for and deleted from 'real' images during normal operation.

To check that the camera alignment has not been disturbed a set of four passive reference marks, fixed to the bar guide structure and in the fields of view of the cameras 14, is used. The second phase of the calibration procedure involves the determination of the location of these marks (with the flashtubes 10 turned on and video thresholds set) and the storage of this information in non-volatile memory. If, during normal operation, the location of these reference marks is found to be different to the stored locations an error is flagged by the system, indicating that the measured data may be in error and that calibration should be checked or repeated.

The last stage of calibration involves the determination of the angles defining the camera alignment and the range or distance of the camera to the measurement plane (this determines the scaling of the image processing). This is achieved using a known target shape from the image of which the slave computer extracts a contour estimate. The master computer then determines the system parameters by fitting the shape to a known reference and stores the system parameters in non-volatile memory.

All slaves acquire and process images which the master then links to form a composite bar contour. The composite contour is displayed and relevant data extracted and displayed. The operator can specify whether the image enhancement processing is to include a preliminary 'fit' to the largest circular feature. The operator can specify the distance from the nose of the bar that the first measurement is taken and the type of data extraction required. The bar shape and nominal size should be entered so that the gauge can compare the actual and desired dimensions.

Figure 8:
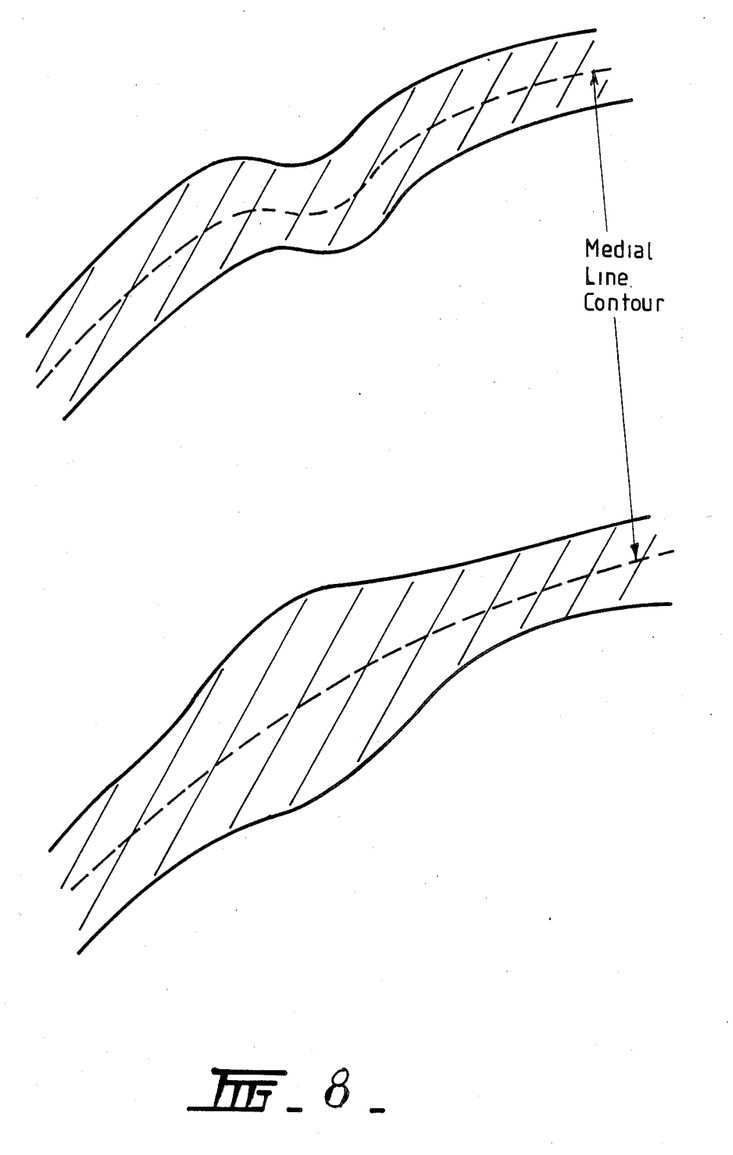
FIG. 8 shows typical bar images and contours.

The data extraction can be roll or product related and can extract a wide variety of dimensions dependent on the bar shape and operator requirements. Examples of some of the data display formats are depicted in FIG. 8.

Since modification within the spirit and scope of the invention may readily be effected by persons skilled within the art, it is to be understood that this application is not limited to the particular embodiment described by way of example hereinabove.

The claims defining the invention are as follows:

1. A method of providing information as to the cross-sectional shape or profile of at least a portion of a surface of a body, comprising the steps of:
  providing a known datum, said known datum including at least four substantially planar surfaces defining at least four planes substantially perpendicular to a measurement plane such that four lines formed by the intersection of said planes with the measurement plane define at least three non-colinear reference locations at the intersections of said lines;

detecting said known datum with a detecting apparatus;

determining a geometrical image tranformation from said known datum which would transfer the detected shape defined by the reference locations from an image plane to an object plane to the true shape defined by the reference locations in the known datum;

illuminating said body to produce a reflected light from said body to provide preliminary information as to the cross-sectional shape or profile of the body;

performing said geometrical image transformation on said preliminary information to thereby change the shape of the preliminary information to thereby compensate for distortions due to the geometrical relationship between the detecting apparatus and the body, said geometrical image transformation transforming said preliminary information from an image plane to an object plane so as to provide a better indication of the true cross-sectional shape or profile of at least a portion of the surface of the body.

2. The method of claim I, wherein the known datum consists of a bar which has a cross-section in the form of a cross and the first, second, third and fourth planes are defined by the end surface of one arm of the cross, a side surface of that arm of the cross, a side surface of an adjacent arm of the cross and the end surface of the adjacent arm of the cross.

3. The method of claim I, wherein calibration parameters are determined from said reference locations so that exact reference locations can be determined, the exact reference locations being used as said known datum, said calibration parameters being determined by obtaining calibration data from said known datum by viewing the reference locations with a plurality of sensing means, and processing said data to establish a true measurement plane where the relationship of each sensing means to every other sensing means is accurately determined by iteratively determining said calibration parameters.

4. A method of providing information as to the cross-sectional shape or profile of at least a portion of a surface of a body, comprising the steps of:

providing a known datum;

detecting said known datum to form at least three reference locations from said known datum which, with a derived fourth reference location, define a parallelogram whose shape can be used to determine calibration parameters;

iteratively determining said calibration parameters so that substantially exact first, second, third and fourth reference locations can be determined;

illuminating said body to produce reflected light from said body to provide preliminary information as to the cross-sectional shape or profile of the body;

transforming said preliminary information in accordance with a variation of the position of said substantially exact reference locations from the known positions of said reference locations on said known datum to provide a better indication of the true cross-sectional shape or profile of at least a portion of the surface of the body to therefore provide said information or allow the information to be obtained therefrom, wherein said determination of calibration data from said known datum is by a plurality of sensing means; and processing said data to establish a true measurement plane where the relationship of each sensing means to every other sensing means is accurately determined by iteratively determining said calibration parameters.

5. The method of claim 4, wherein the illumination from said body is strobed to provide a substantially stationary image of said body when preliminary information as to the cross-section shape or profile of the body is obtained.

6. An apparatus for providing information as to the cross-sectional shape or profile of at least a portion of a surface of a body, said apparatus comprising:

illumination means for projecting light towards said body;

sensing means for detecting light from a known datum means, said known datum means including at least four substantially planar surfaces defining at least four planes substantially perpendicular to a measurement plane such that lines formed by the intersection of said planes with said measurement plane cause at least three non-colinear reference locations to be defined by the intersections of said lines, the sensing means sensing light from said body to provide preliminary information concerning said body and said datum means;

transforming means for determining a geometrical image transformation from said reference points which would transfer the shape defined by the detected reference point from an image plane to an object plane to provide the true shape defined by the reference points in the datum and performing said geometrical image transformation on said preliminary information to thereby change the shape of the preliminary information to compensate for distortion due to the geometrical relationship between said sensing means and the body, said transforming means transforming the preliminary information from an image plane to an object plane so as to provide an indication of the true cross-sectional shape of the body.

7. The apparatus of claim 6, wherein the known datum consists of a bar which has a cross-section in the form of a cross and the first, second, third and fourth planes are defined by the end surface of one arm of the cross, a side surface of that arm of the cross, a side surface of an adjacent arm of the cross and the end surface of the adjacent arm of the cross.

8. The apparatus of claim 6, and further including processing means for calculating calibration parameters so that exact reference locations an be determined, the exact reference locations being used on said known datum said processing means determining the calibration parameters by receiving calibration data from said known datum via a plurality of said sensing means and processing said data to establish a true measurement plane where the relationship of each sensing means to every other sensing means is accurately determined by iteratively determining said calibration parameters.

9. An apparatus for providing information as to the cross-sectional shape or profile of at least a portion of a surface of a body, said apparatus comprising:

illumination means for projecting light towards said body;

sensing means for detecting light from a known datum from which at least three reference locations can be substantially exactly determined which a derived fourth reference location being determined to define a parallelogram which can be used to determine calibration parameters;

processing means for iteratively determining said calibration parameters, said sensing means sensing light from said body to provide preliminary information concerning said body, said processing means also being for transforming said preliminary information in accordance with a variation of the location of said substantially exact reference locations from the known locations from the known datum means to provide a better indication of the cross-sectional shape or profile of at least a portion of the surface of the body to thereby provide said information or allow the information to be obtained therefrom, wherein said processing means receives calibration data from said known datum from a plurality of said sensing means and processes said data to establish a true measurement plane where the relationship of each sensing means to every other sensing means is accurately determined by iteratively determining said calibration parameters.

* * * * *